US011702247B2

(12) United States Patent
Zhou

(10) Patent No.: US 11,702,247 B2
(45) Date of Patent: Jul. 18, 2023

(54) BIOLOGICAL SHEET STORAGE DEVICE

(71) Applicant: BOE TECHNOLOGY GROUP CO., LTD., Beijing (CN)

(72) Inventor: Shi Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 532 days.

(21) Appl. No.: 16/757,452

(22) PCT Filed: Oct. 17, 2018

(86) PCT No.: PCT/CN2018/110579
§ 371 (c)(1),
(2) Date: Apr. 20, 2020

(87) PCT Pub. No.: WO2019/157829
PCT Pub. Date: Aug. 22, 2019

(65) Prior Publication Data
US 2021/0188485 A1     Jun. 24, 2021

(30) Foreign Application Priority Data
Feb. 13, 2018   (CN) .......................... 201810150479.5

(51) Int. Cl.
*B65D 25/10*   (2006.01)
*A01N 1/02*    (2006.01)
(Continued)

(52) U.S. Cl.
CPC .......... *B65D 25/10* (2013.01); *A01N 1/0263* (2013.01); *B01L 9/52* (2013.01); *B65D 81/22* (2013.01);
(Continued)

(58) Field of Classification Search
CPC ........ B65D 25/10; B65D 81/22; B65D 85/50; B65D 25/101; B65D 33/16; A01N 1/0263;
(Continued)

(56) References Cited

U.S. PATENT DOCUMENTS

| 3,556,633 A | 1/1971 | Mutschmann et al. |
| 2004/0091395 A1 | 5/2004 | Ward et al. |

(Continued)

FOREIGN PATENT DOCUMENTS

| CN | 2831170 | 10/2006 |
| CN | 201158654 | 12/2008 |

(Continued)

OTHER PUBLICATIONS

International Search Report from PCT/CN2018/110579 dated Jan. 15, 2019.
(Continued)

*Primary Examiner* — Dean Kwak
(74) *Attorney, Agent, or Firm* — Calfee, Halter & Griswold LLP

(57) ABSTRACT

A biological sheet storage device includes a fixation arrangement and a storage box. The fixation arrangement includes a first carrier, a second carrier and a fixing piece. The first carrier is configured to carry a biological sheet and positioned on the second carrier. The fixing piece is configured to fix the first carrier on the second carrier. The storage box is configured to encapsulate the fixation arrangement carrying the biological sheet. A limiting mechanism for limiting the fixation arrangement is included in the storage box.

14 Claims, 5 Drawing Sheets

(51) Int. Cl.
   *B01L 9/00* (2006.01)
   *B65D 81/22* (2006.01)
   *B65D 85/50* (2006.01)

(52) U.S. Cl.
   CPC ........ *B65D 85/50* (2013.01); *B01L 2300/021* (2013.01); *B01L 2300/18* (2013.01)

(58) Field of Classification Search
   CPC .. B01L 9/52; B01L 2300/021; B01L 2200/18; B01L 2300/0609; B01L 9/00; B01L 2300/041; B01L 2300/043; B01L 2300/08; B01L 2300/0809
   See application file for complete search history.

(56) References Cited

U.S. PATENT DOCUMENTS

| | | |
|---|---|---|
| 2004/0161855 A1 | 8/2004 | Kvasnik et al. |
| 2005/0112034 A1 | 5/2005 | McCormick |
| 2007/0116612 A1 | 5/2007 | Williamson, IV |
| 2009/0104699 A1 | 4/2009 | Newby et al. |
| 2012/0088267 A1* | 4/2012 | Ramachandran Iyer ................... G01N 1/36 435/40.52 |
| 2015/0044765 A1 | 2/2015 | Inoue |
| 2019/0076847 A1* | 3/2019 | Donovan ........... G01N 21/6428 |

FOREIGN PATENT DOCUMENTS

| | | |
|---|---|---|
| CN | 201163310 | 12/2008 |
| CN | 101836101 | 9/2010 |
| CN | 102707420 | 10/2012 |
| CN | 104012521 | 9/2014 |
| CN | 104396942 | 3/2015 |
| CN | 106560409 | 4/2017 |
| CN | 206350340 | 7/2017 |
| CN | 108328082 | 7/2018 |
| EP | 1782737 | 5/2007 |
| JP | 2014079170 | 5/2014 |
| WO | 2013051521 | 4/2013 |

OTHER PUBLICATIONS

Written Opinion from PCT/CN2018/110579 dated Jan. 15, 2019.
Office action from Chinese Application No. 201810150479.5 dated Feb. 2, 2019.

* cited by examiner

BIOLOGICAL SHEET STORAGE DEVICE

CROSS REFERENCE TO RELATED APPLICATIONS

The present application is a national stage application under 35 U.S.C. 371 of PCT International Application No. PCT/CN2018/110579, filed on Oct. 17, 2018, which claims the benefit of a Chinese Patent Application No. 201810150479.5 filed on Feb. 13, 2018, the contents of which are incorporated herein by reference in their entireties.

TECHNICAL FIELD

The present disclosure relates to a storage device, in particular to a biological sheet storage device for storing a biological sheet.

BACKGROUND

Biological sheets have become research hotspots in a field of biological tissue engineering in recent years. They have a wide range of applications in treatment of skin, cornea, heart, periodontal, and other related diseases.

SUMMARY

An embodiment of the present disclosure provides a biological sheet storage device, including:

a fixation arrangement including a first carrier, a second carrier, and a fixing piece, wherein the first carrier is configured to carry a biological sheet, the first carrier is located on the second carrier, and the fixing piece is configured to fix the first carrier on the second carrier; and a storage box configured to encapsulate the fixation arrangement carrying the biological sheet, wherein a limiting mechanism for limiting the fixation arrangement is included in the storage box.

In some embodiments, the fixing piece includes at least one pressing piece, the first carrier includes a body for carrying the biological sheet and an extension extending from the body, and the pressing piece is configured to movably press against at least a portion of the extension of the first carrier.

In some embodiments, the fixing piece includes a plurality of pressing pieces, and a first end of each pressing piece is connected to a first connector.

In some embodiments, the fixing piece includes two parallel rectangular pressing pieces, each of which has a first end extending beyond the second carrier and connected to the first connector.

In some embodiments, a second end of each of the pressing pieces is connected to a second connector.

In some embodiments, the pressing piece, the first connector and the second connector are connected to form a closed area, and the biological sheet is positioned inside an orthographic projection area of the closed area under the state that the first carrier carries the biological sheet.

In some embodiments, the first carrier includes an air permeable and water permeable cover film configured to at least partially cover the biological sheet in a state where the first carrier carries the biological sheet.

In some embodiments, the first connector is connected with the second carrier through a rotating mechanism which is configured to separate the fixing piece from the second carrier or engage the fixing piece with the second carrier.

In some embodiments, the first carrier includes at least one projection connected to the extension.

In some embodiments, the first carrier is a carrying film made of a material having tissue compatibility with the biological sheet carried thereon.

In some embodiments, the biological sheet comprises a cell sheet.

In some embodiments, the storage box comprises a box body and a cover body positioned on the box body, the limiting mechanism is positioned in the box body, the limiting mechanism comprises a plurality of limiting pieces for forming a limiting region, and the fixation arrangement is limited to be positioned in the limiting region.

In some embodiments, the cover body comprises at least one iii heat conductive element which can extend into the box body for conducting heat so as to reduce the temperature in the box body.

In some embodiments, the box body includes at least one handle.

In some embodiments, the box body and/or the cover body are provided with an identification code.

DETAILED DESCRIPTION OF THE DISCLOSURE

Figure 1:
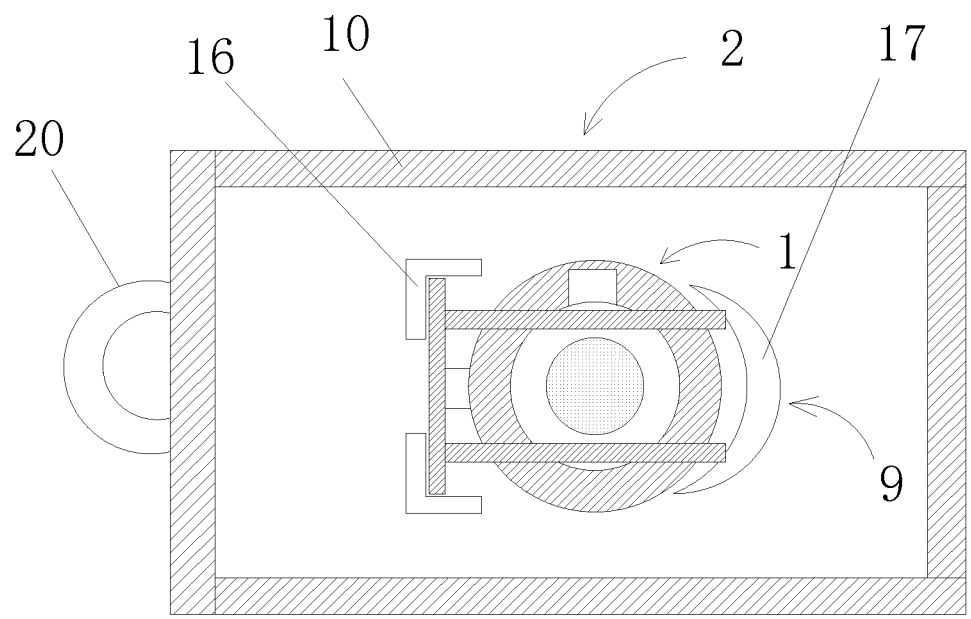
FIG. 1 is a schematic plan view of a biological sheet storage device in some embodiments of the disclosure (only one fixation arrangement is fixed in the storage box in the figure).

Embodiments of the present disclosure are described in detail below with reference to the accompanying drawings.

The terms "first," "second," and similar terms used in the present disclosure do not denote any order, quantity, or importance, but are used to distinguish different parts. The terms "including" or "comprising" and the like mean that the elements preceding the word include the elements listed after the word, and do not exclude the possibility of the other elements. "Upper", "lower", "left", "right", etc. are only used to indicate the relative positional relationship, and when the absolute position of the object to be described is changed, the relative positional relationship may also change accordingly.

In the present disclosure, when it is described that a particular device is located between a first device and a second device, there may be intervening devices between the particular device and the first device or the second device, or there may be no intervening devices. When it is described that a particular device is connected to other device, that particular device can be directly connected to the other device without intervening devices, or can be indirectly connected to the other device with intervening devices.

All terms (including technical or scientific terms) used in the present disclosure have the same meaning as understood by one of ordinary skill in the art to which this disclosure belongs, unless specifically defined otherwise. It should also be understood that terms defined in, for example, a general dictionary should be interpreted as having a meaning consistent with their meaning in the context of the related art, without adopting idealized or extremely formal meanings, unless explicitly defined otherwise herein.

Techniques, methods and apparatus known to those of ordinary skill in the relevant art may not be discussed in detail, but the techniques, methods and apparatus should be considered as part of the specification, where appropriate.

In the technology known to the inventors, there is no storage device designed to be used for a biological sheet. Common cell storage devices usually store cultured living cells. In order to facilitate cell cryopreservation or resuscitation, the inner surface of the storage device is usually provided with a transparent sheet-like structure with an arc surface and a super-hydrophobic surface functional area and a hydrophilic surface functional area as a carrier. This kind of device can be used for fixed preservation of living cells, but cannot meet the requirement of storage and transportation of biological sheets.

In the embodiment of the present disclosure, the biological sheets include, but not limited to, cell sheets, physiological slices, skin samples, tissue sample slices, etc. For example, the biological sheet may be a cell sheet (cell membrane sheet) having a three-dimensional structure.

The embodiment of the disclosure provides a biological sheet storage device capable of protecting a biological sheet and supporting the storage of the biological sheet.

Figure 2:
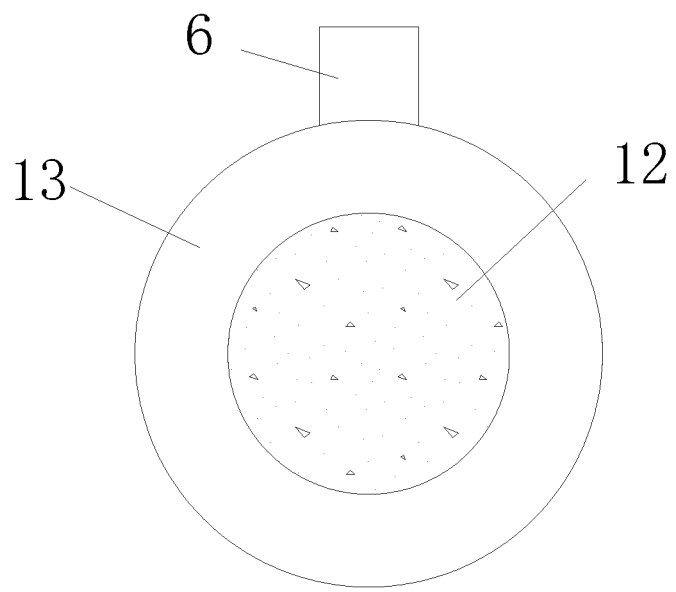
FIG. 2 is a schematic plan view of a biological sheet attached to a first carrier in some embodiments of the disclosure.

As shown in FIGS. 1 and 2, the present disclosure provides a biological sheet storage device including:

a fixation arrangement 1 which includes a first carrier 13, a second carrier 3 and a fixing piece 4; wherein the first carrier 13 is configured to carry a biological sheet 12, the first carrier 13 is disposed on the second carrier 3, and the fixing piece 4 configured to fix the first carrier 13 on the second carrier 3; and a storage box 2 which is configured to encapsulate the fixation arrangement 1 carrying the biological sheet, wherein the storage box 2 includes a limiting mechanism 9 for limiting the fixation arrangement 1.

According to the storage device of the embodiment of the present disclosure, fixing the biological sheet 12 can not only prevent the biological sheet 12 from being damaged due to mutual collision in transportation process caused by direct contact with the second carrier 3, but also effectively prevent the biological sheet 12 from being pressed by the fixing piece 4 due to direct contact with the biological sheet 12 and thus causing damage to the biological sheet 12, so as to more thoroughly protect the biological sheet 12 and prolong the service life of the biological sheet 12. By being encapsulated and protected in the storage box 2, all-round protection to the biological sheet 12 is realized, long-term low-temperature storage and long-distance transportation of the biological sheet 12 can be supported. Therefore, the biological sheet 12 can be ensured not to be worn, torn, or wrinkled during the cryopreservation and transportation process, and the structure, toughness, and biological activity of the biological sheet 12 will not be affected.

In some embodiments of the present disclosure, as shown in FIG. 2, the first carrier 13 is of a shape matching the outer shape of the biological sheet 12. In this embodiment, the biological sheet 12 is circular as an example, so the shape of the first carrier 13 is correspondingly circular (of course, other shapes such as a rectangle, a trapezoid, an ellipse, etc. can also be used).

In some embodiments of the present disclosure, an outer contour dimension of the first carrier 13 is larger than an outer contour dimension of the biological sheet 12, for example, an outer periphery of the first carrier 13 extends beyond an outer periphery of the biological sheet 12 to stably carry, attach, or fix the biological sheet 12.

In some embodiments of the present disclosure, the material of the first carrier 13 is not unique, for example, a rigid material with smooth surface, or a flexible material with certain toughness, etc.

In some embodiments, the first carrier 13 includes a carrying film made of a material having tissue compatibility with the biological sheet 12. Carrying the biological sheet 12 by the carrying film enables the biological sheet 12 to be tightly attached to the carrying film without needing any external force.

In some embodiments of the present disclosure, a flexible material is used for the carrying film, which can facilitate the biological sheet 12 to be placed on the carrying film in a flat and wrinkle-free form. The carrying film on the second carrier 3 also has a protecting and buffering effect to the biological sheet 12 on the second carrier 3.

In some embodiments, materials having tissue compatibility with the biological sheet 12 include at least one of polyethylene, polypropylene, polyethylene glycol, polystyrene, nylon, polyacetal, polycarbonate, polyvinyl alcohol, polyethyleneimine, polysulfone, polylactic acid, polymethacrylate, polyurethane, glass, ceramic, and dextran.

In some embodiments of the present disclosure, in order to facilitate the user to move the carrying film, the carrying film is further provided with a projection 6 for the user to grasp. The projection 6 can be made of a material (such as a hard plastic), which does not affect the characteristics of the carrying film and does not introduce impurities into the carrying film but has certain mechanical toughness. It can also be made of a material which can be used for preparing the carrying film, and can also be made of the same material as the carrying film.

In some embodiments of the present disclosure, for example, the fixing piece 4 is configured as one or more clamping mechanisms, and at least two clips of the clamping mechanism are configured to respectively press the first carrier 13 and the second carrier 3, for example, press an edge area of the first carrier 13, an edge area of the second carrier 3, or other selected positions (for example, the selected positions correspond to the outer peripheral area of the first carrier), thereby fixing the first carrier 13 and the second carrier 3 together.

Figure 3:
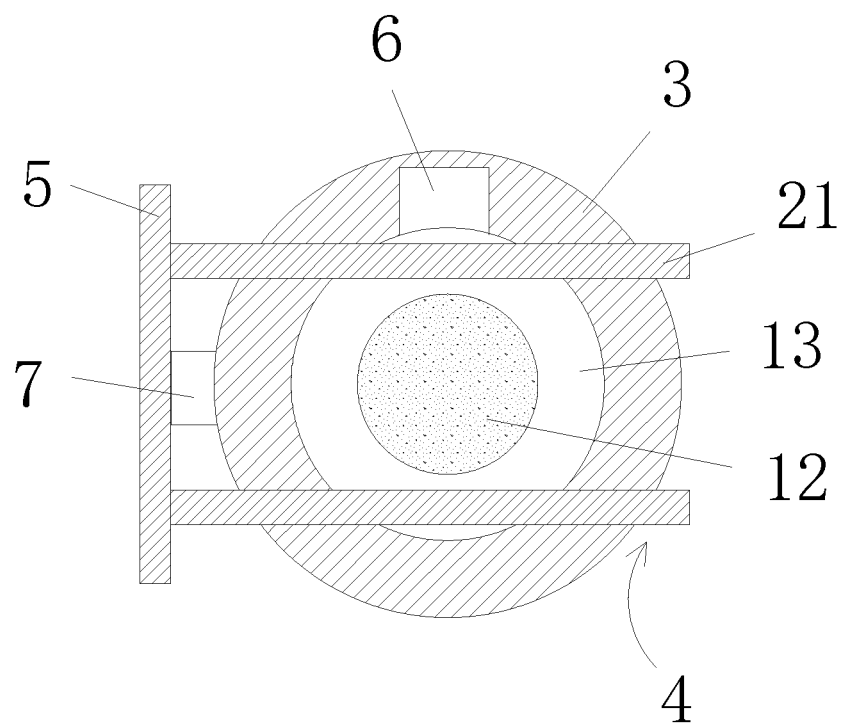
FIG. 3 is a schematic plan view of a fixation arrangement in some embodiments of the disclosure.
Figure 4:
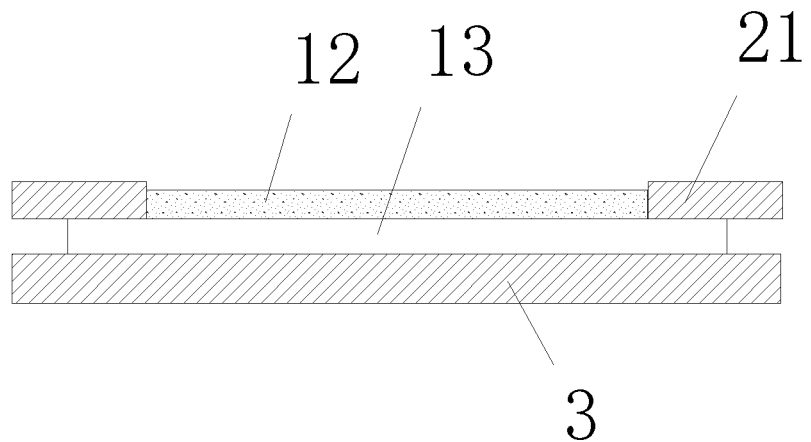
FIG. 4 schematically shows a side sectional view of a fixation arrangement in an embodiment of the present disclosure.

The fixation arrangement 1 shown in FIGS. 3 and 4 of the present disclosure can be applied to a case where a portion of the first carrier 13 extending beyond the biological sheet 12 is narrow. For the case where the portion of the first carrier extending beyond the biological sheet 12 is wider, the fixing piece 4 may be made into a plate shape having a larger width to press the first carrier with a larger area. When both the biological sheet 12 and the first carrier 13 are large, or the biological sheet 12 is small while the first carrier 13 is large so that the portion of the first carrier 13 extending beyond the biological sheet 12 is large, the number of fixing pieces 4 can be increased. For example, a group of fixing pieces 4 are respectively arranged at positions at two sides of the biological sheet 12, and the number of fixing pieces 4 can be determined according to the shape of the fixing pieces 4. If the fixing pieces 4 are rod-shaped or narrow strip-shaped plates, more (for example, not less than 5) fixing pieces 4 may be provided. If the fixing pieces 4 are plate-shaped with larger width, fewer (for example, 2-5) fixing pieces 4 may be provided.

In some embodiments, the fixing piece 4 is configured to include at least one pressing piece 21, the first carrier 13 includes a body for carrying the biological sheet 12 and an extension extending from the body (the extension does not correspond to the biological sheet), the extension extending beyond the body. The pressing piece 21 is configured to movably press against at least a portion of the extension of the first carrier 13.

In some embodiments, the fixing piece 4 includes a plurality of pressing pieces 21, each pressing piece 21 having a first end connected to a first connector 5.

For example, referring to FIGS. 3 and 4, the fixing piece 4 of the fixation arrangement 1 includes two pressing pieces 21 (the pressing pieces 21 are not limited to a sheet shape, other shapes such as a pressing rod shape, a pressing block shape, etc. can also be used) and the first connector 5. The first connector 5 is in a strip shape (any other shape may be applicable). The two pressing pieces 21 are arranged in parallel, and the first ends (left ends in FIG. 3) of the two pressing pieces 21 extend beyond the second carrier 3. The first connector 5 is respectively connected with the first ends of the two pressing pieces 21 extending beyond the second carrier 3, so that the fixation arrangement 1 in this embodiment is approximately π-shaped. When a user wants to operate the fixing piece 4, the user can complete the operation of the fixing piece 4 by operating the first connector 5.

In some embodiments, the shape of each pressing piece may be rectangular, trapezoidal, triangular, arcuate, etc.

Figure 5:
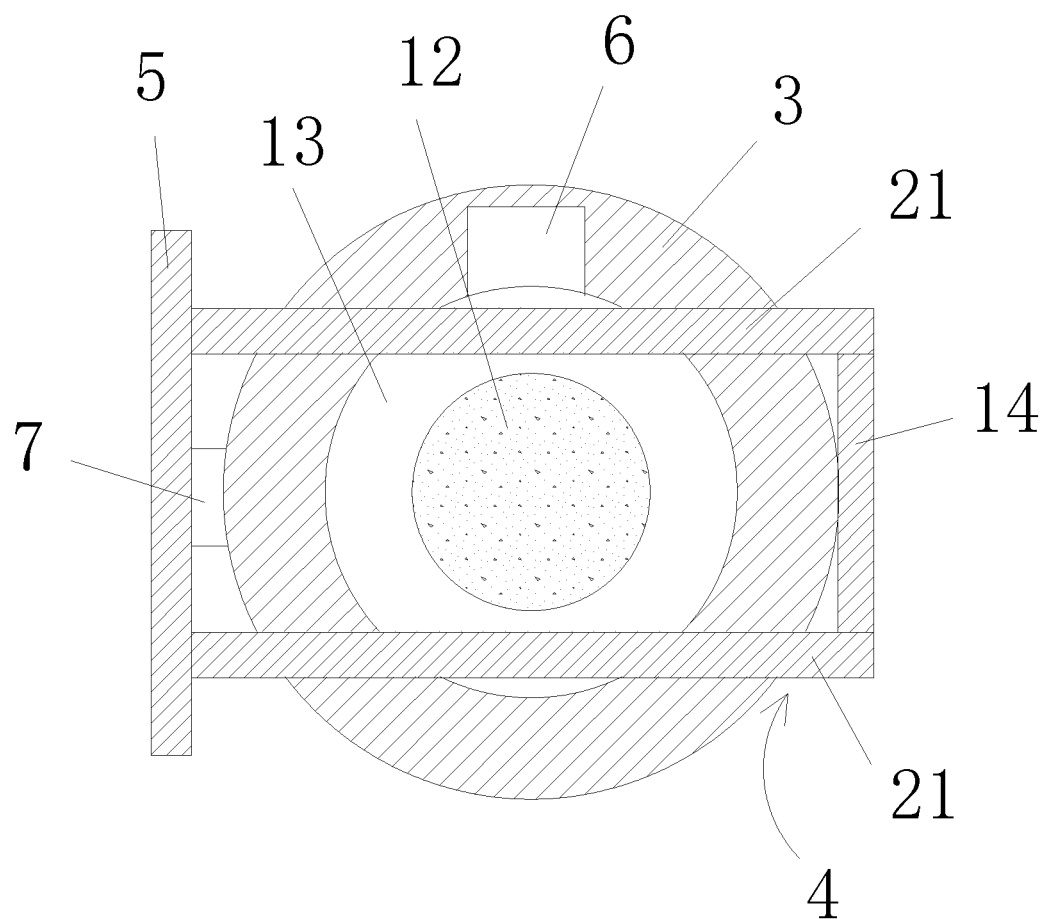
FIG. 5 is a schematic plan view of a fixation arrangement in some embodiments of the disclosure.
Figure 6:
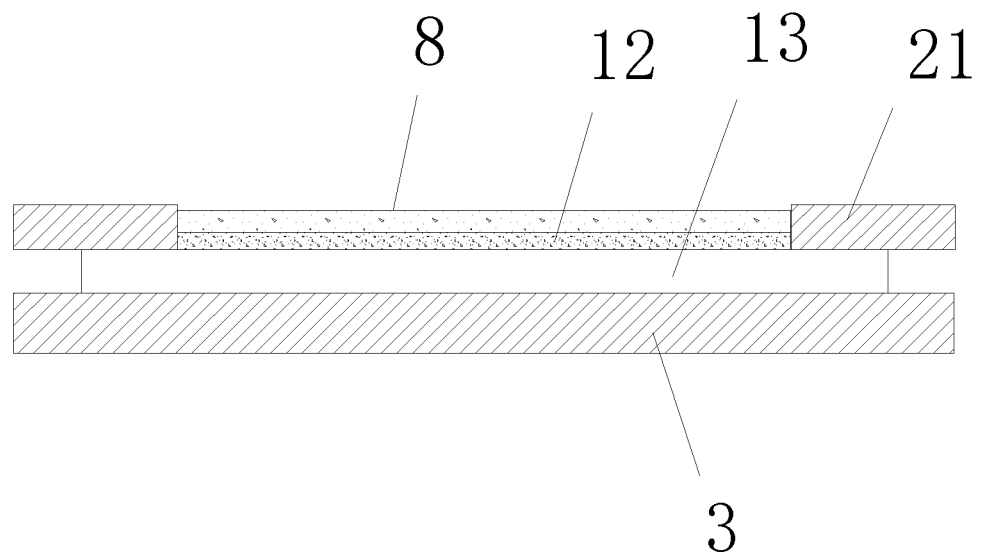
FIG. 6 schematically shows a side sectional view of a fixation arrangement in some embodiments of the present disclosure.

In some embodiments of the present disclosure, as shown in FIGS. 5 and 6, the second carrier 3 is also in a shape of a circular plate (of course, other shapes and structures are also possible), and the fixation arrangement 1 also includes a first connector 5 and a fixing piece 4 composed of two pressing pieces 21 arranged in parallel, and the first connector 5 is also in the shape of a strip. In addition, the fixation arrangement 1 further includes a second connector 14, which is not unique in shape, for example, is still strip-shaped like the first connector 5. The second end (right end in FIG. 5) of each pressing piece 21 in the above-mentioned fixing piece 4 is connected to the second connector 14.

For example, two ends of the two pressing pieces 21 extend out of the second carrier 3, and the first connector 5 and the second connector 14 are respectively arranged at two ends of the two pressing pieces 21, so that the first connector 5, the second iii connector 14 and the two pressing pieces 21 cooperate to form a rectangular closed area, and the biological sheet 12 is positioned in an orthographic projection area of the closed area (i.e., when the fixing piece 4 rotates to press against the first carrier, the biological sheet 12 is positioned in the orthographic projection area of the closed area).

Referring to FIGS. 5 and 6, in some embodiments of the present disclosure, the first carrier 13 further includes a cover film 8 for covering the biological sheet 12 in the closed area to further protect and limit the biological sheet 12. The cover film 8 is made of a film material that is permeable to air and water, that is, the air permeable and water permeable cover film 8 is configured to at least partially cover the biological sheet 12 in a state where the first carrier 13 carries the biological sheet 12. Wherein, the above-mentioned fixing pieces 4 may also be increased in number according to actual situation, so is the fixing pieces 4 shown in FIG. 3.

In some embodiments, the cover film 8 may be made of a polymer material having a microporous structure, for example, a material of the first carrier.

In some embodiments of the present disclosure, in order to integrate the fixing piece 4, especially the pressing piece 21 thereof, with the second carrier 3 to facilitate the user to store and carry it, to facilitate the user to operate the fixing piece 4 and to facilitate the engagement and separation of the fixing piece 4 and the second carrier 3, the fixation arrangement 1 further includes a rotating mechanism 7 which is connected with the second carrier 3 and the first connector 5 respectively to enable the fixing piece 4 (together with the first connector 5) to rotate relative to the second carrier 3, that is, the rotating mechanism 7 is configured to realize the separation or engagement of the fixing piece 4 and the first connector 5 by rotation.

For example, firstly, the rotating mechanism 7 is driven, and in turn the rotating mechanism 7 drives the first connector 5 to rotate together with the fixing piece 4 to be separated from the second carrier 3 so as to place the biological sheet 12 on the first carrier 13. Then, the rotating mechanism 7 is driven in an opposite direction to drive the first connector 5 and the fixing piece 4 to rotate in the opposite direction to a position where the fixing piece 4 is engaged with the second carrier 3, that is a position where the fixing piece 4 is pressed on the first carrier 13, thereby fixing the first carrier and the biological sheet 12 on the second carrier 3 together.

The structure of the rotating mechanism 7 is not unique, as long as the fixing piece 4 is rotatably connected with the second carrier 3. For example, a hinge can be used as the rotating mechanism 7, or a rotating shaft and a shaft sleeve assembly can be used as the rotating mechanism 7.

Figure 7:
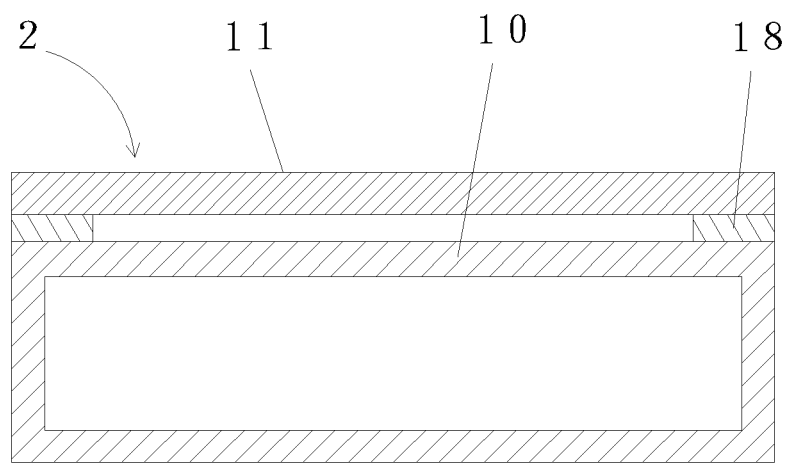
FIG. 7 is a sectional view of a storage box in some embodiments of the disclosure.
Figure 11:
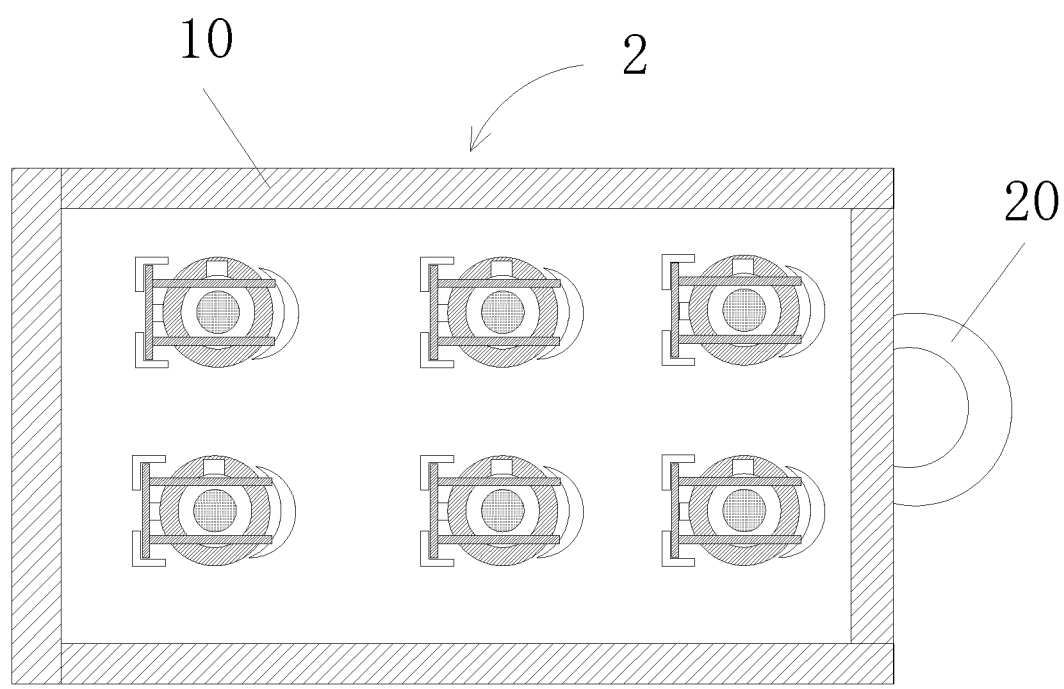
FIG. 11 is a schematic plan view of a plurality of fixation arrangements stored in a storage box in some embodiments of the disclosure.

In some embodiments of the present disclosure, as shown in FIGS. 1, 7 and 11, the storage box 2 includes a box body 10 and a cover body 11 covered on the box body 10. For example, the cover body 11 is fixed to the box body 10 by screw threads or by snap-fit or the like.

In some embodiments, the cover body 11 is provided with a sealing ring 18 to seal the box body 10 when the cover body 11 is covered on the box body 10.

In some embodiments, the shape and size of the box body 10 may be determined according to the number of fixation arrangements 1 to be fixed according to actual needs, that is, a plurality of fixation arrangements 1 can be fixed in the storage box 2 in this embodiment.

In some embodiments of the present disclosure, a handle 20 is provided on the box body 10 to facilitate the user to carry the storage box 2 with a large-volume.

In some embodiments, the limiting mechanism 9 is arranged in the box body 10, and the number and position of the limiting mechanisms 9 can also be determined according to the number and preset positions of the fixation arrangements 1 that need to be fixed in practice.

As shown in FIGS. 1 and 11, in some embodiments of the present disclosure, the limiting mechanism 9 includes a plurality of limiting pieces that cooperate to enclose a limiting region for limiting the fixation arrangement 1 so that the fixation arrangement 1 can only move in a selected direction (e.g., a direction perpendicular to the limiting region). For example, the plurality of limiting pieces limit the fixation arrangement 1 by respectively abutting against the second carrier 3 and the first connector 5 of the fixation arrangement 1. A group of the limiting pieces are abutted against the second carrier 3, and another group of the limiting pieces are abutted against the first connector 5. The specific positions and shapes of each limiting piece in the two groups of the limiting pieces are not fixed (i.e., the shape of each limiting piece is not unique, and the positions are not limited, which can be determined according to the shape and structure of the second carrier 3 and the preset positions of the fixation arrangement 1), so long as they can cooperate to limit the fixation arrangement 1, and obvious displacement of the fixation arrangement 1 in the horizontal direction shown in FIG. 11 can be avoided.

In some embodiments of the present disclosure, referring to FIGS. 1 and 11, the limiting piece may be a limiting block or a limiting plate. For example, the limiting piece includes two oppositely disposed L-shaped first limiting block 16 and a circular arc-shaped second limiting block 17. The first connector 5 is located between the two first limiting blocks 16, and both ends of the first connector 5 respectively abut against corners of the two L-shaped first limiting blocks 16, so that the fixation arrangement 1 can only move in a vertical direction perpendicular to the first connector 5 at this time. The second limiting block 17 is arranged at a side opposite to the first connector 5 and is adapted to the outer edge of the second carrier 3 to cooperate with the two first limiting blocks 16 to limit the movement of the fixation arrangement 1 in a horizontal direction.

Figure 8:
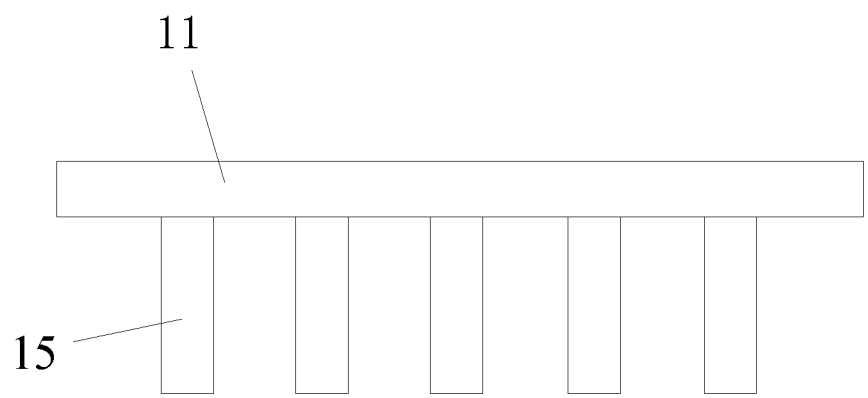
FIG. 8 is a schematic structural view of a cover body in some embodiments of the disclosure.
Figure 9:
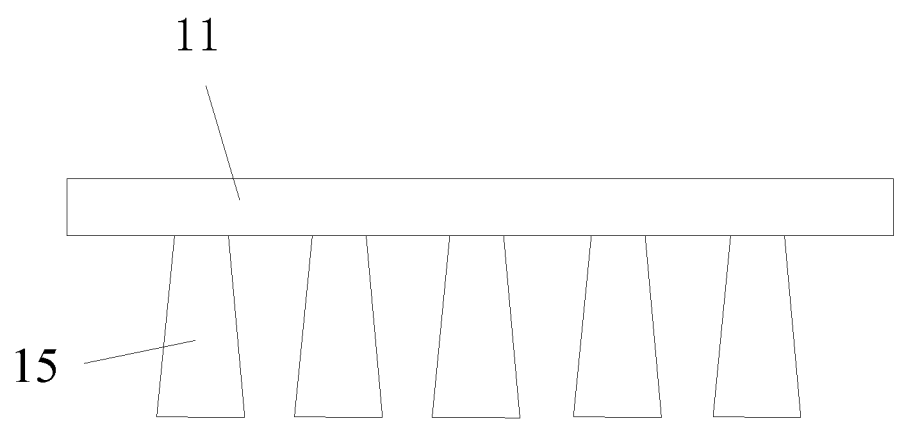
FIG. 9 is a schematic structural view of a cover body in some embodiments of the disclosure.

In some embodiments of the present disclosure, as shown in FIGS. 8 and 9, the cover body 11 is further provided with heat conductive elements 15 that can extend into the box body 10, and the heat conductive elements 15 are used for conducting heat to reduce the temperature in the box body 10. That is, when the temperature in the box 10 is relatively high, the heat in the box 10 can be conducted to the cover 11 through the heat conductive elements 15 and then led out from the cover 11 to keep the box 10 in a low temperature state and avoid affecting the biological activity of the biological sheet 12. The number and distribution of the heat conductive elements 15 are not unique. For example, they can be distributed over the entire cover 11, or the plurality of heat conductive elements 15 may be arranged alternately in an array, etc.

In some embodiments, the heat conductive element 15 is made of a high heat conductive material (such as metal, heat conductive rubber, heat conductive ceramic or some other heat conductive polymer) into a rod shape, a column shape, a strip plate shape or a truncated cone shape, a truncated pyramid shape, etc.

In some embodiments, the heat conductive element 15 is in the shape of a strip plate.

In some embodiments, as shown in FIG. 9, the heat conductive element 15 is configured in a form that is narrow in an end adjacent to the cover body 11 and wide in an end extending in the box body 10 to improve heat conducting efficiency.

Figure 10:
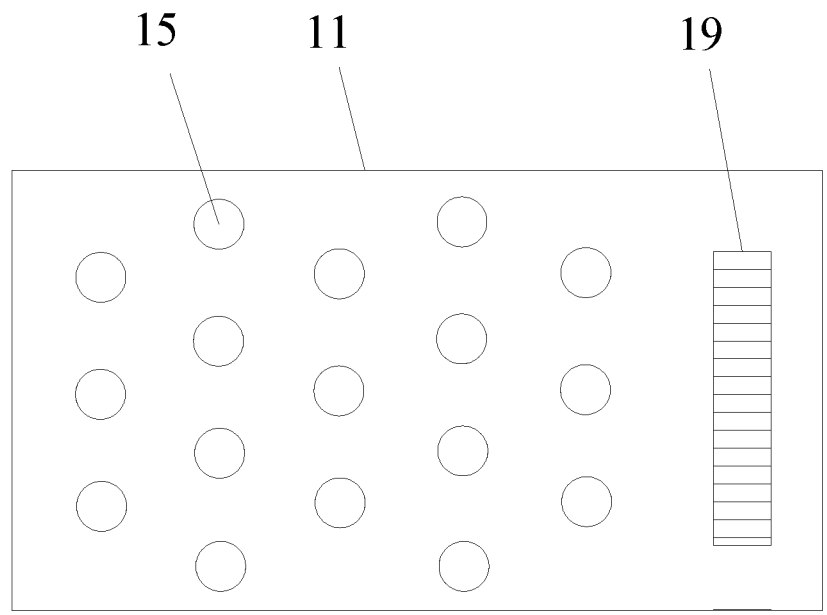
FIG. 10 is a top view of a cover in some embodiments of the disclosure.

In some embodiments of the present disclosure, as shown in FIG. 10, the cover 11 is further provided with an identification code 19.

In some embodiments of the present disclosure, the box 10 is provided with an identification code 19.

In some embodiments, the identification code 19 includes a bar code or a two-dimensional code.

In some embodiments, the number of identification code(s) 19 may be one or more and may be determined according to actual needs.

The user can identify the identification code 19 through an electronic detection device (such as a code scanning gun) to realize automatic management of large quantities of biological sheets and improve management efficiency.

It should be noted that the present disclosure uses expressions "an embodiment", "one embodiment" or "some embodiments" along with their derivatives, and these expressions and terms mean that a specific feature, structure or characteristic described in connection with the embodiment is included in at least one embodiment. The appearances of the phrase "in one embodiment" in various places in this disclosure are not necessarily all referring to the same embodiment.

It should be understood that the words "a" or "an" in the claims of the present disclosure do not exclude plural numbers, and are only intended for convenience of description and should not be construed as limiting the scope of protection of the present disclosure. Although the subject matter has been described in language specific to structural features and/or methodological acts, it should be understood that the subject matter defined in the appended claims is not necessarily limited to the specific features or acts described above. On the contrary, the specific features and acts described above are disclosed as exemplary forms of implementing the claims. Obviously, those skilled in the art can make various changes and modifications to the embodiments of the present disclosure without departing from the spirit and scope of the present disclosure. Thus, if these modifications and variations of the present disclosure fall within the scope of the claims of the present disclosure and their equivalents, the present disclosure is also intended to include these modifications and variations.

The invention claimed is:

1. A biological sheet storage device for storing a biological sheet comprising:

a fixation arrangement comprising a first carrier, a second carrier, and a fixing piece, wherein the first carrier is configured to carry the biological sheet and is located on the second carrier, and the fixing piece is configured to fix the first carrier on the second carrier; and a storage box configured to encapsulate the fixation arrangement carrying the biological sheet, wherein a limiting mechanism for limiting the fixation arrangement is included in the storage box, wherein the fixing piece comprises at least one pressing piece, the first carrier comprises a body for carrying the biological sheet and an extension extending from the body, the extension extends beyond the body, and the at least one pressing piece is configured to movably press against at least a portion of the extension of the first carrier without pressing against the body of the first carrier, and wherein the limiting mechanism comprises a plurality of limiting pieces for forming a limiting region, and the fixation arrangement is limited to be positioned in the limiting region.

2. The biological sheet storage device according to claim 1, wherein the fixing piece comprises a plurality of pressing pieces, and a first end of each of the plurality of pressing pieces is connected to a first connector.

3. The biological sheet storage device according to claim 2, wherein the fixing piece comprises two parallel rectangular pressing pieces, and a first end of each of the two parallel rectangular pressing pieces extends beyond the second carrier and is connected to the first connector.

4. The biological sheet storage device according to claim 2, wherein a second end of each of the two parallel rectangular pressing pieces is connected to a second connector.

5. The biological sheet storage device according to claim 4, wherein the two parallel rectangular pressing pieces, the first connector and the second connector are connected to form a closed area, and the biological sheet is located inside an orthographic projection area of the closed area in a state where the first carrier carries the biological sheet.

6. The biological sheet storage device according to claim 2, wherein the fixation arrangement comprises an air and water permeable cover film configured to at least partially cover the biological sheet in a state where the first carrier carries the biological sheet.

7. The biological sheet storage device according to claim 2, wherein the first connector is connected to the second carrier through a rotating mechanism configured to separate or engage the fixing piece and the second carrier.

8. The biological sheet storage device according to claim 1, wherein the first carrier comprises at least one projection connected to the extension.

9. The biological sheet storage device according to claim 1, wherein the first carrier is in a form of a film made of a material selected from at least one of polyethylene, polypropylene, polyethylene glycol, polystyrene, nylon, polyacetal, polycarbonate, polyvinyl alcohol, polyethyleneimine, polysulfone, polylactic acid, polymethacrylate, polyurethane, glass, ceramic, and dextran.

10. The biological sheet storage device according to claim 1, wherein the biological sheet comprises a cell sheet.

11. The biological sheet storage device according to claim 1, wherein the storage box comprises a box body and a cover body positioned on the box body, the limiting mechanism is positioned in the box body.

12. The biological sheet storage device according to claim 11, wherein the cover body comprises at least one heat conductive element which can extend into the box body for conducting heat to reduce temperature in the box body.

13. The biological sheet storage device according to claim 11, wherein the box body comprises at least one handle.

14. The biological sheet storage device according to claim 11, wherein at least one of the box body or the cover body is provided with an identification code.

\* \* \* \* \*